(12) United States Patent
Van Dyne

(10) Patent No.: US 10,219,616 B1
(45) Date of Patent: Mar. 5, 2019

(54) EQUIPMENT STAND ASSEMBLY

(71) Applicant: Trace Eugene Van Dyne, Sunbury, OH (US)

(72) Inventor: Trace Eugene Van Dyne, Sunbury, OH (US)

(*) Notice: Subject to any disclaimer, the term of this patent is extended or adjusted under 35 U.S.C. 154(b) by 0 days.

(21) Appl. No.: 15/700,092

(22) Filed: Sep. 9, 2017

Related U.S. Application Data

(60) Provisional application No. 62/385,882, filed on Sep. 9, 2016.

(51) Int. Cl.
*F16M 11/00* (2006.01)
*A47B 23/04* (2006.01)

(52) U.S. Cl.
CPC ........ *A47B 23/04* (2013.01); *A47B 2023/049* (2013.01)

(58) Field of Classification Search
CPC ....... F16C 11/10; B60R 11/02; B60R 11/0252
See application file for complete search history.

(56) References Cited

U.S. PATENT DOCUMENTS

| | | | | |
|---|---|---|---|---|
| 5,751,548 A * | 5/1998 | Hall | ........................ | F16C 11/10 248/122.1 |
| 6,168,126 B1 * | 1/2001 | Stafford | .................. | B60R 11/02 248/122.1 |
| 7,946,542 B1 * | 5/2011 | Chapman | ............ | B60R 11/0252 248/122.1 |
| 7,988,113 B2 * | 8/2011 | Yang | ...................... | F16M 11/10 248/276.1 |

* cited by examiner

*Primary Examiner* — Amy J. Sterling
(74) *Attorney, Agent, or Firm* — The Law Office of Patrick F. O'Reilly, LLC

(57) ABSTRACT

A stand assembly for supporting an object in a cantilevered manner above a surface is disclosed herein. The stand assembly includes a post member; a tray member coupled to the post member, the tray member configured to be rotatable between an active position for supporting the object and a collapsed position; an angular setting mechanism configured to set a user-desired angular position of the tray member relative to the post member; and a latching mechanism configured to maintain the tray member in the active position when engaged with the tray member by preventing a rotation of the tray member. The user-desired angular position setting of the tray member is maintained when the tray member is rotated from the active position to the collapsed position so that the tray member generally returns to the user-desired angular position when the tray member is rotated from the collapsed position to the active position.

20 Claims, 11 Drawing Sheets

SECTION B-B

EQUIPMENT STAND ASSEMBLY

CROSS-REFERENCE TO RELATED APPLICATIONS

This patent application claims priority to, and incorporates by reference in its entirety, U.S. Provisional Patent Application No. 62/385,882, entitled "Equipment Stand Assembly", filed on Sep. 9, 2016.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a stand assembly for supporting an object above a surface. More particularly, the invention relates to an equipment stand assembly for supporting an item of equipment (e.g., laptop) in a cantilevered manner above a surface, such as a tabletop surface.

2. Background

Conventional equipment stands are known that are designed to support items of equipment, such as electronic equipment, in an elevated manner. However, these conventional equipment stands suffer from numerous limitations and drawbacks. First of all, when these conventional equipment stands are angularly adjustable by a user, the preferred angular position setting of the user is not remembered when the stand is collapsed. Thus, each time the equipment stand is set up by the user, the user must readjust the stand in an attempt to configure the equipment stand in its desired angular position. As such, because the user must set the preferred angular position of the stand each time the stand is set up, it is nearly impossible for the user to achieve the same preferred angular position of the stand every time. Consequently, the user of a conventional equipment stand may often use the equipment stand in an angular orientation that is less than ideal. Secondly, in addition to this laborious repositioning each time during setup, many conventional equipment stands are also difficult to use because they require a significant amount of force to be applied to the stand by the user in order to lock the stand into its desired angular position. And, because this significant amount of force must be applied each time the stand is set up, these conventional equipment stands require a great deal of effort every time that they are used. Thirdly, many conventional equipment stands require a series of elaborate steps to be carried out by the user each time that the stands are used, thereby resulting in a laborious setup each and every time that the stand is utilized by the user.

Therefore, what is needed is a stand assembly that remembers a preferred angular position setting of a user even when the stand is collapsed, thereby obviating the need for a user to reconfigure the preferred angular position of the stand each time the stand is used. Moreover, a stand assembly is needed that does not require a significant amount of force to lock the stand into its desired angular position. Furthermore, a stand assembly is needed that does not require a series of elaborate steps to be carried out by the user each time that the stand is used.

BRIEF SUMMARY OF EMBODIMENTS OF THE INVENTION

Accordingly, the present invention is directed to an equipment stand assembly that substantially obviates one or more problems resulting from the limitations and deficiencies of the related art.

In accordance with one or more embodiments of the present invention, there is provided a stand assembly for supporting an object in a cantilevered manner above a surface. The stand assembly includes a post member; a tray member coupled to the post member, the tray member configured to support the object in the cantilevered manner above the surface, the tray member configured to be rotatable between an active position for supporting the object and a collapsed position; an angular setting mechanism, the angular setting mechanism configured to set a user-desired angular position of the tray member relative to the post member so as to establish a user-desired angular position setting; and a latching mechanism, the latching mechanism configured to maintain the tray member in the active position when the latching mechanism is engaged with the tray member by preventing a rotation of the tray member relative to the post member. In these one or more embodiments, the user-desired angular position setting is maintained when the tray member is rotated from the active position to the collapsed position so that the tray member generally returns to the user-desired angular position when the tray member is rotated from the collapsed position to the active position.

In a further embodiment of the present invention, the post member comprises a vertical portion and a horizontal portion, the tray member being rotatably coupled to the horizontal portion of the post member by means of an inner tubular member.

In yet a further embodiment, the tray member comprises a base portion for receiving the object supported thereon and at least one tubular sleeve rotatably coupled to the horizontal portion of the post member by means of the inner tubular member.

In still a further embodiment, the base portion of the tray member is tangentially attached to the at least one tubular sleeve of the tray member.

In yet a further embodiment, the latching mechanism comprises a snap button device, the snap button device comprising an elongate strip portion with a detent disposed thereon, the elongate strip portion of the snap button device having a curved shape so that the elongate strip portion is capable of being received within an interior of an inner tubular member, the detent of the snap button device extending through a first aperture in a wall of the inner tubular member.

In still a further embodiment, the post member comprises a vertical portion and a horizontal portion, the horizontal portion of the post member comprising a second aperture for receiving the detent of the snap button device when the latching mechanism is engaged so as to prevent the rotation of the tray member relative to the post member.

In yet a further embodiment, the angular setting mechanism comprises an inner tubular member having a first end and a second end disposed opposite to the first end, at least one end securement member disposed at one of the first and second ends of the inner tubular member, an elongate rod coupled to the at least one end securement member, and a handle member coupled to the elongate rod. In this further embodiment, when a user applies a tightening torque to the handle member, the elongate rod is configured to axially displace the at least one end securement member inwardly towards a center of the inner tubular member so that a portion of the inner tubular member bulges radially outward, thereby preventing a rotation of the tray member relative to the inner tubular member and establishing the user-desired angular position setting of the tray member.

In still a further embodiment, the at least one end securement member comprises a first end securement member disposed at the first end of the inner tubular member and a second end securement member disposed at the second end of the inner tubular member, the first end securement member being attached to a first end of the elongate rod, and the handle member being attached to a second end of the elongate rod that is opposite to the first end of the elongate rod. In this further embodiment, when a user applies the tightening torque to the handle member, the elongate rod is configured to axially displace the first end securement member inwardly towards the center of the inner tubular member and the handle member is configured to axially displace the second end securement member inwardly towards the center of the inner tubular member so that opposed end portions of the inner tubular member bulge radially outward, thereby preventing a rotation of the tray member relative to the inner tubular member and establishing the user-desired angular position setting of the tray member.

In yet a further embodiment, the elongate rod is provided with a plurality of external threads disposed along a length thereof, the first end securement member is provided with an internally threaded bore for threadingly engaging the external threads at the first end of the elongate rod, and a shaft portion of the handle member is provided with a plurality of internal threads disposed therein for threadingly engaging the external threads at the second end of the elongate rod.

In still a further embodiment, the second end securement member comprises a non-threaded aperture disposed therethrough for receiving the elongate rod, the non-threaded aperture of the second end securement member allowing the second end securement member to be slidably displaced relative to the threaded elongate rod.

In yet a further embodiment, the handle member is in the form of a repositionable handle with a handle portion that is capable of being rotated relative to a shaft portion of the handle member so that the handle portion of the handle member is capable of being selectively repositioned by the user without interfering with the user-desired angular position setting of the tray member, and preventing the handle portion of the handle member from obstructing the object supported by the tray member.

In still a further embodiment, the shaft portion of the handle member comprises a plurality of circumferentially spaced-apart external teeth thereon, and the handle portion of the handle member comprises a plurality of circumferentially spaced-apart internal teeth thereon that are configured to matingly engage with the plurality of circumferentially spaced-apart external teeth on the shaft portion. In this further embodiment, when a user displaces the handle portion of the handle member in an axially outward direction, the plurality of circumferentially spaced-apart internal teeth on the handle portion are disengaged from the plurality of circumferentially spaced-apart external teeth on the shaft portion so as to allow the handle portion to freely rotate for repositioning. Also, in this further embodiment, when the handle portion of the handle member is not displaced by the user in an axially outward direction, the plurality of circumferentially spaced-apart internal teeth on the handle portion are engaged with the plurality of circumferentially spaced-apart external teeth on the shaft portion so as to allow the user to apply the tightening torque to the handle member for preventing the rotation of the tray member relative to the inner tubular member and establishing the user-desired angular position setting of the tray member.

In yet a further embodiment, the post member comprises a vertical portion and a horizontal portion, the vertical portion of the post member including a plurality of grooves spaced-apart along a length thereof, and wherein the stand assembly further comprises an elastically deformable ring configured to be positioned in a selected one of the plurality of grooves by a user so as to establish a height setting of the post member.

In still a further embodiment, the stand assembly further comprises a clamp assembly configured to couple the post member to the surface, the post member configured to be received within one or more apertures of the clamp assembly, the elastically deformable ring configured to be disposed proximate to a top of the clamp assembly so as to establish the height setting of the post member.

In accordance with one or more other embodiments of the present invention, there is provided a stand assembly for supporting an object in a cantilevered manner above a surface. The stand assembly includes a post member having a vertical portion, the vertical portion of the post member including a plurality of grooves spaced apart along a length thereof; a support member coupled to the post member, the support member configured to support the object in the cantilevered manner above the surface; and an elastically deformable ring configured to be positioned in a selected one of the plurality of grooves in the vertical portion of the post member by a user so as to establish a height setting of the post member.

In a further embodiment of the present invention, the stand assembly further comprises a clamp assembly configured to couple the post member to the surface, the post member configured to be received within one or more apertures of the clamp assembly, the elastically deformable ring configured to be disposed proximate to a top of the clamp assembly so as to establish the height setting of the post member.

In accordance with yet one or more other embodiments of the present invention, there is provided a stand assembly for supporting an object. The stand assembly includes an outer tubular member; an inner tubular member, at least a section of the inner tubular member being disposed within the outer tubular member; a position setting mechanism configured to set an angular position of one of the inner tubular member and the outer tubular member relative to the other of the inner tubular member and the outer tubular member by deforming a portion of the inner tubular member radially outward into frictional engagement with a portion of the outer tubular member, thereby preventing a rotation of the one of the inner tubular member and the outer tubular member relative to the other of the inner tubular member and the outer tubular member.

In a further embodiment of the present invention, the inner tubular member has a first end and a second end disposed opposite to the first end, and the position setting mechanism comprises a first displaceable member disposed at the first end of the inner tubular member, an elongate rod coupled to the first displaceable member, and an adjustment member coupled to the elongate rod. Also, in this further embodiment, when a user applies a tightening torque to the adjustment member, the elongate rod is configured to axially displace the first displaceable member inwardly towards a center of the inner tubular member such that the inner tubular member is deformed radially outward.

In yet a further embodiment, the adjustment member of the position setting mechanism is in the form of a handle member.

In still a further embodiment, the position setting mechanism further comprises a second displaceable member disposed at the second end of the inner tubular member, the first displaceable member being attached to a first end of the elongate rod, and the handle member being attached to a second end of the elongate rod that is opposite to the first end of the elongate rod. Also, in this further embodiment, when a user applies the tightening torque to the handle member, the elongate rod is configured to axially displace the first displaceable member inwardly towards the center of the inner tubular member and the handle member is configured to axially displace the second displaceable member inwardly towards the center of the inner tubular member so that opposed end portions of the inner tubular member are deformed radially outward so as to prevent a rotation of the one of the inner tubular member and the outer tubular member relative to the other of the inner tubular member and the outer tubular member.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
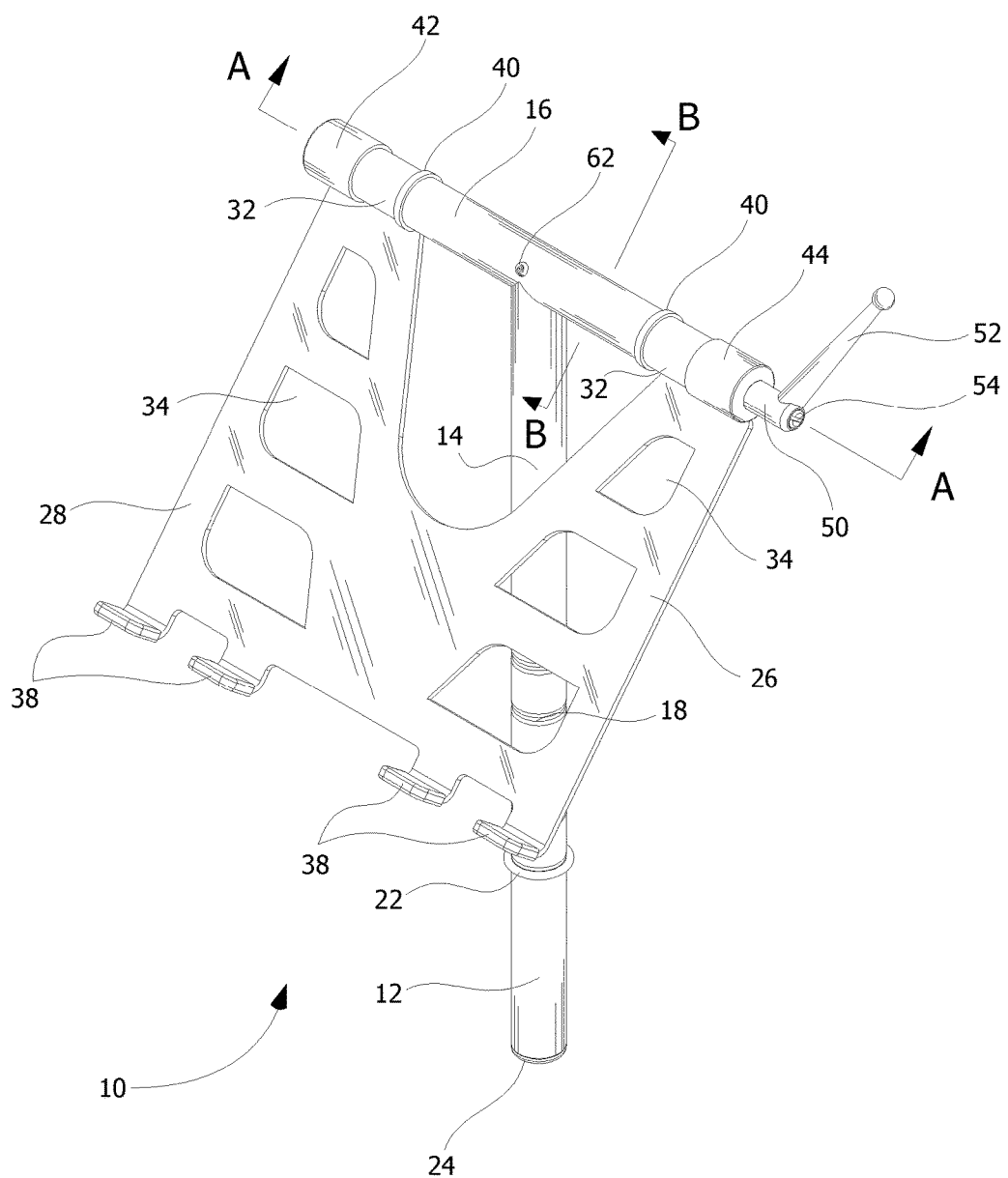
FIG. 1 is a perspective view of an equipment stand assembly, according to an embodiment of the invention, wherein the tray member of the stand assembly is disposed in an active position for supporting an item of equipment.
Figure 2:
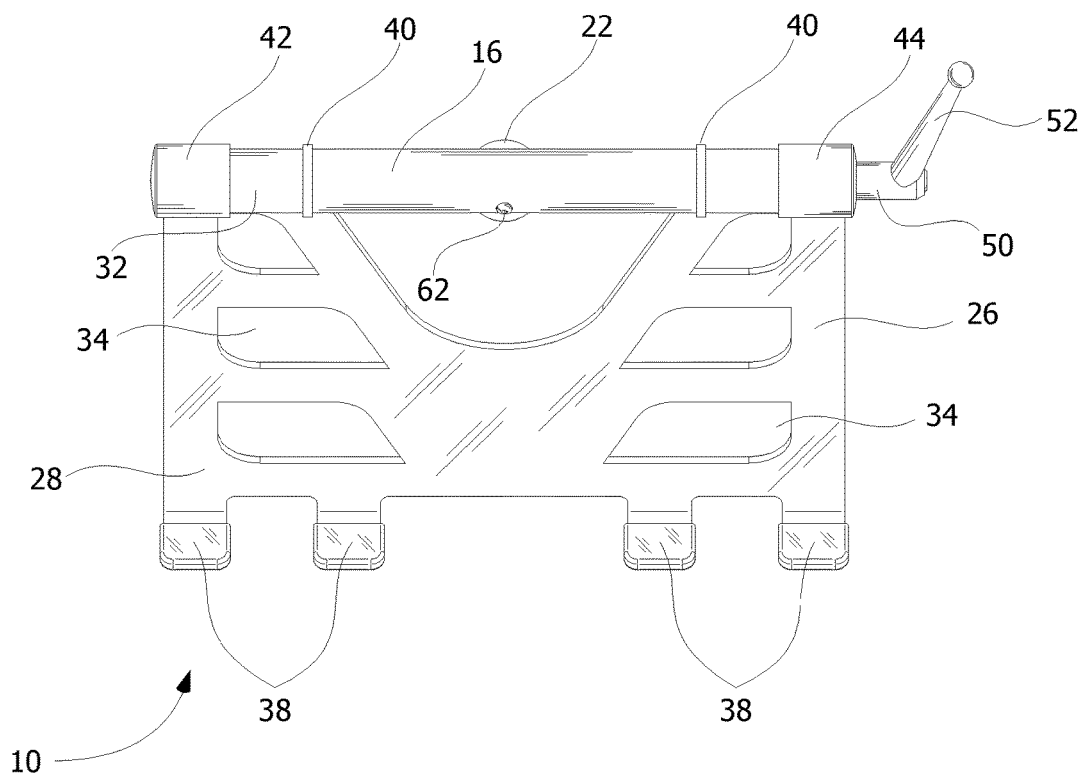
FIG. 2 is a top plan view of the equipment stand assembly of FIG. 1.
Figure 3:
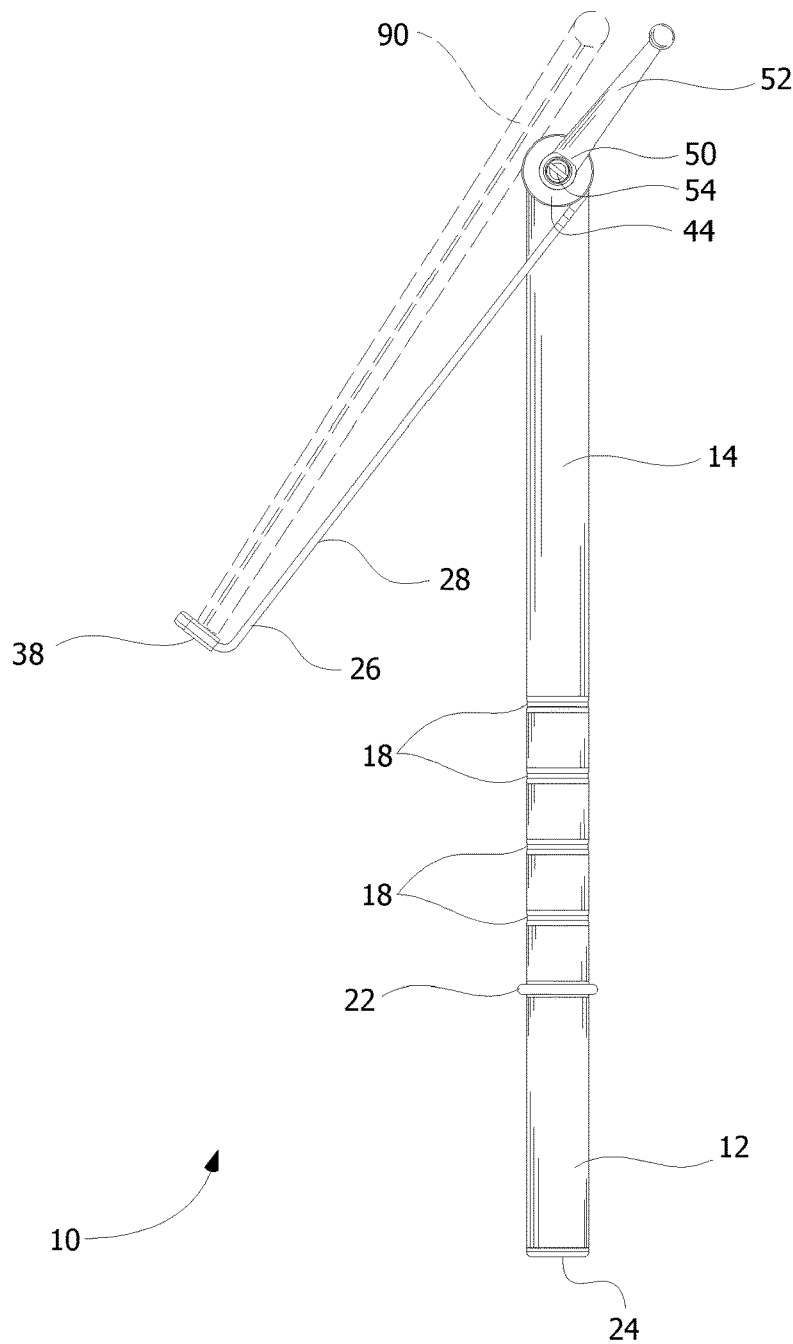
FIG. 3 is a right side elevational view of the equipment stand assembly of FIG. 1.
Figure 4:
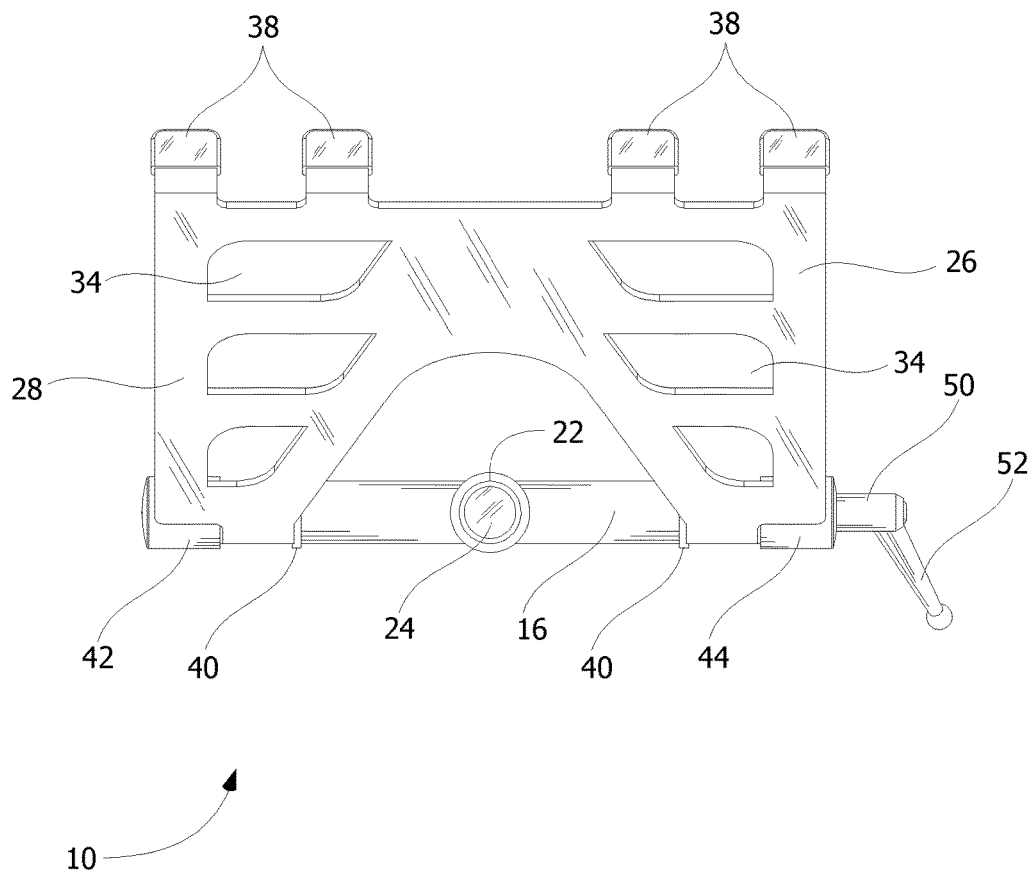
FIG. 4 is a bottom plan view of the equipment stand assembly of FIG. 1.
Figure 5:
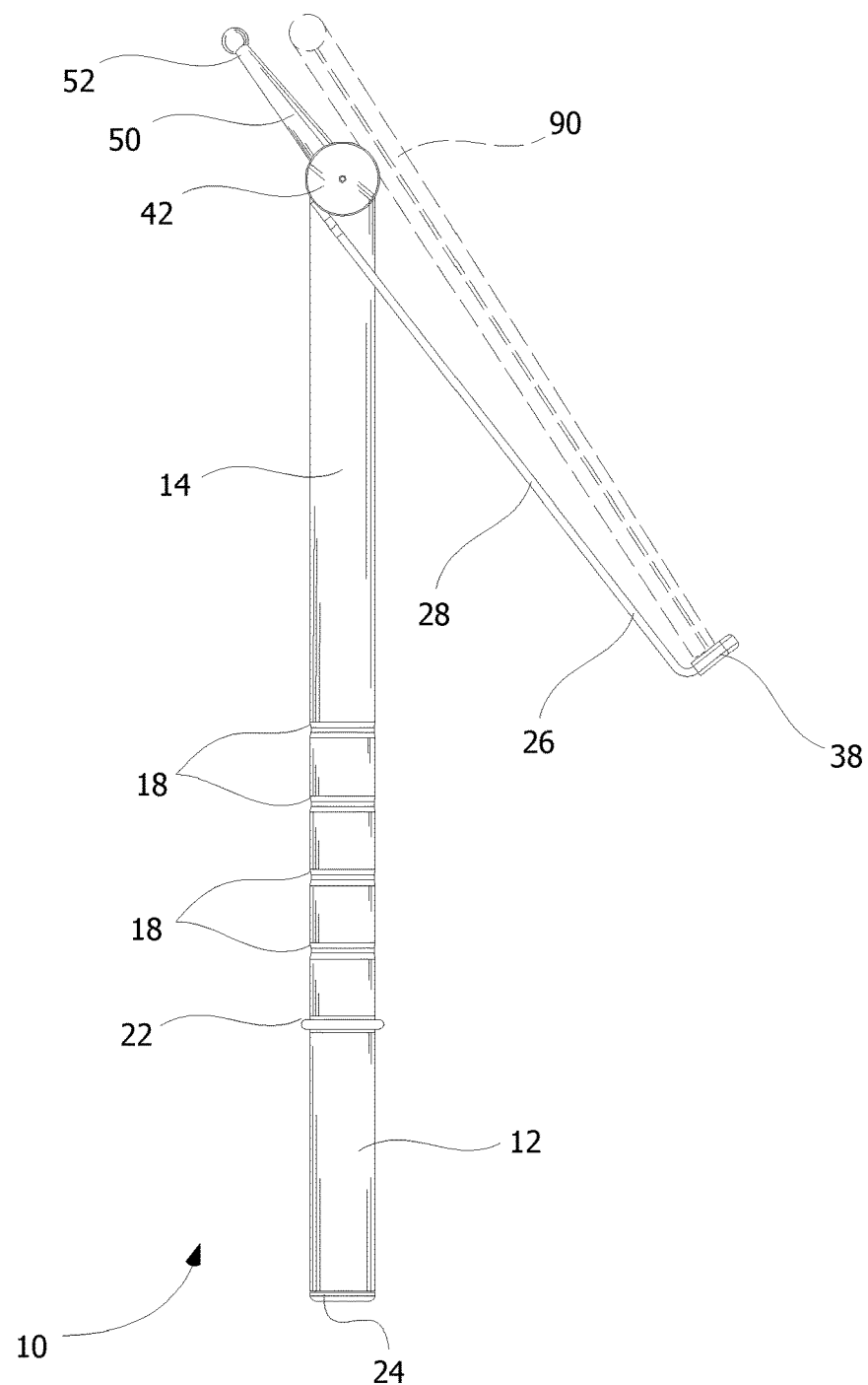
FIG. 5 is a left side elevational view of the equipment stand assembly of FIG. 1.
Figure 6:
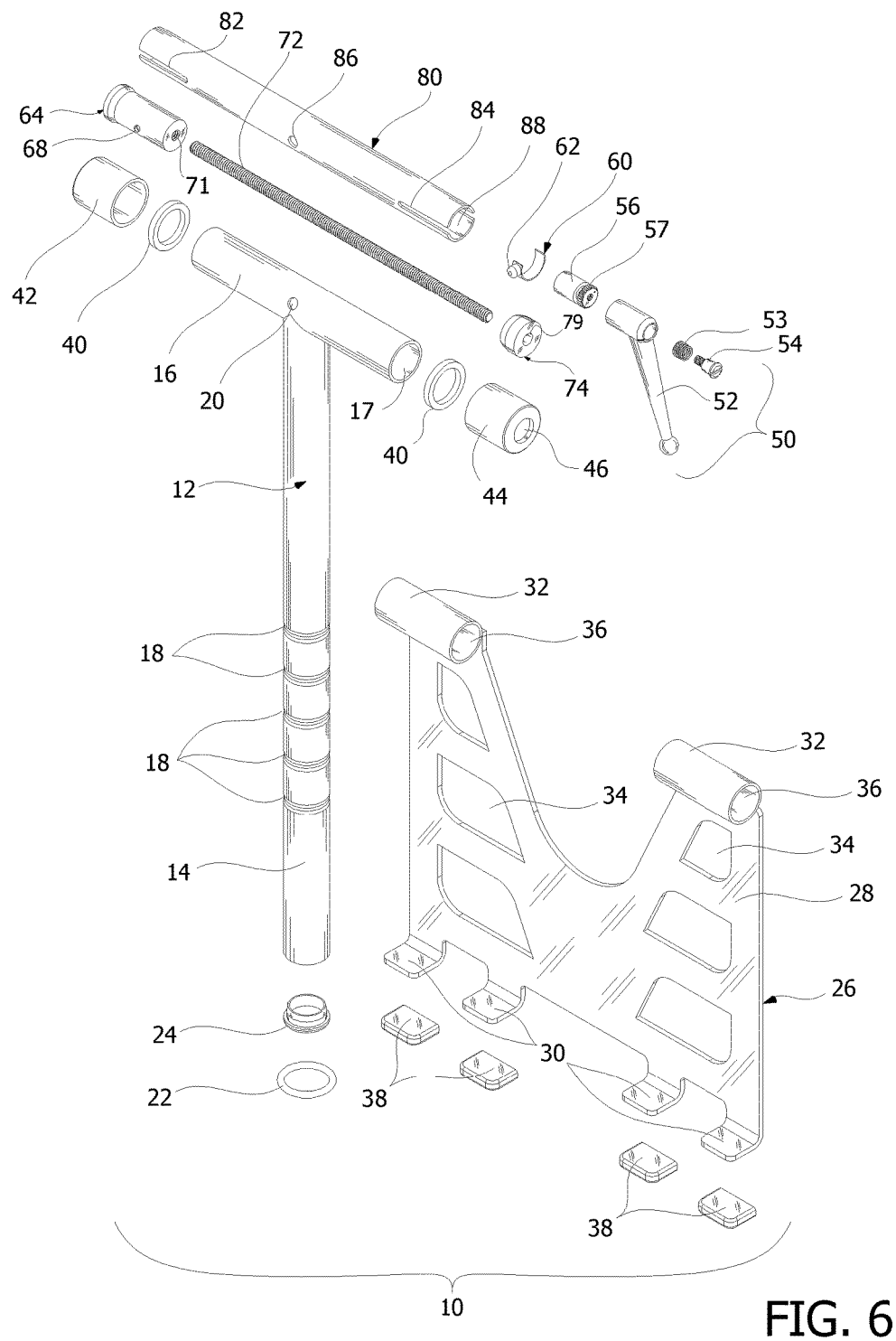
FIG. 6 is an exploded perspective view of the equipment stand assembly of FIG. 1.
Figure 9:
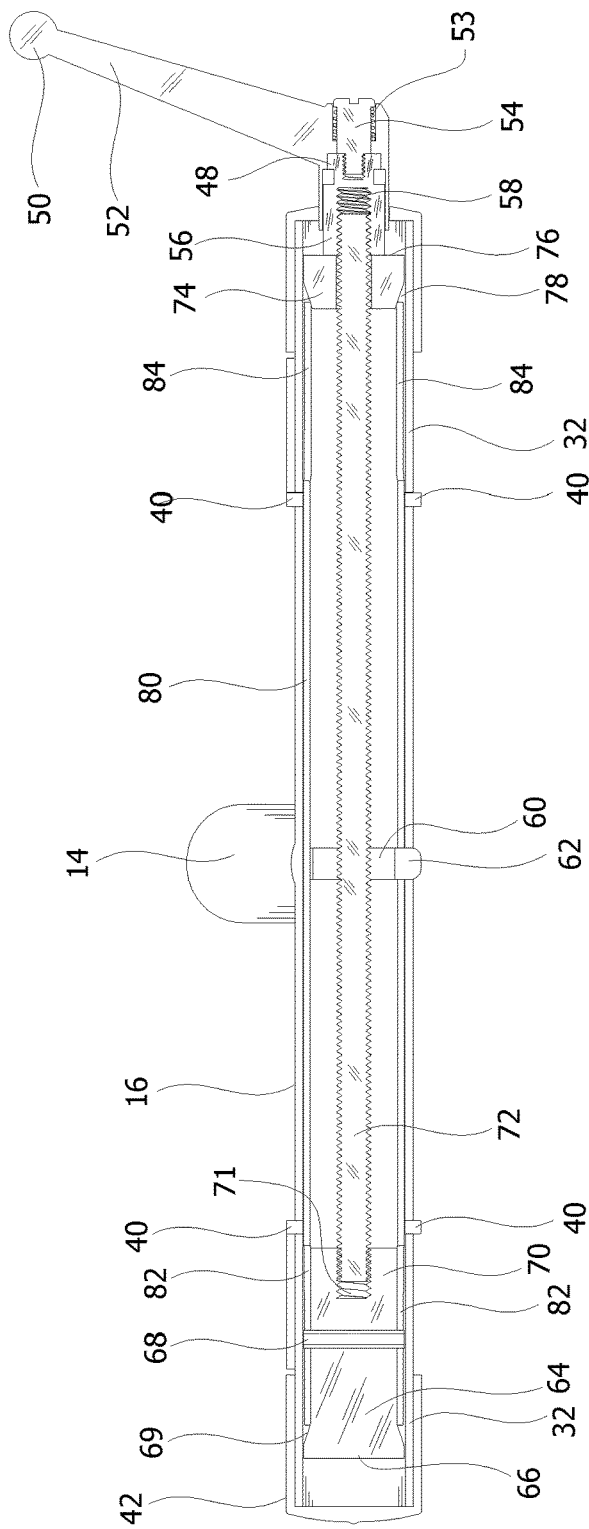
FIG. 9 is a longitudinal sectional view of the upper support subassembly of the equipment stand assembly of FIG. 1, wherein the section is cut along the cutting plane line A-A in FIG. 1.

An illustrative embodiment of an equipment stand assembly is seen generally at 10 in FIGS. 1-8. The illustrated equipment stand assembly 10 is particularly useful for supporting an item of equipment, such as a laptop computing device 90 (see FIGS. 3 and 5), in a cantilevered manner above a surface, such as a tabletop surface (e.g., the portion of the tabletop 92 illustrated in FIG. 10). With reference initially to FIGS. 1, 6, and 9, it can be seen that the equipment stand assembly 10 generally comprises a post member 12 and a tray member 26 coupled to the post member 12. The tray member 26 is configured to support the item of equipment (e.g., the laptop computer 90) in a cantilevered manner above a surface (e.g., above the surface of the tabletop 92). The tray member 26 is configured to be rotatable between an active position for supporting the item of equipment (as shown in FIGS. 1, 3, and 5) and a collapsed position (see FIG. 7). Referring again to FIGS. 1, 6, and 9, it can be seen that the equipment stand assembly 10 further comprises an angular setting mechanism 50, 64, 72, 74, 80 and a latching mechanism 60. The angular setting mechanism 50, 64, 72, 74, 80 is configured to set a user-desired angular position of the tray member 26 relative to the post member 12 so as to establish a user-desired angular position setting. The latching mechanism 60 is configured to maintain the tray member 26 in the active position when the latching mechanism 60 is engaged with the tray member 26 by preventing a rotation of the tray member 26 relative to the post member 12. Advantageously, the equipment stand assembly 10 described herein enables the user-desired angular position setting to be maintained when the tray member 26 is rotated from the active position of FIG. 1 to the collapsed position of FIG. 7 so that the tray member 26 generally returns to the user-desired angular position when the tray member 26 is rotated from the collapsed position of FIG. 7 to the active position of FIG. 1.

Figure 10:
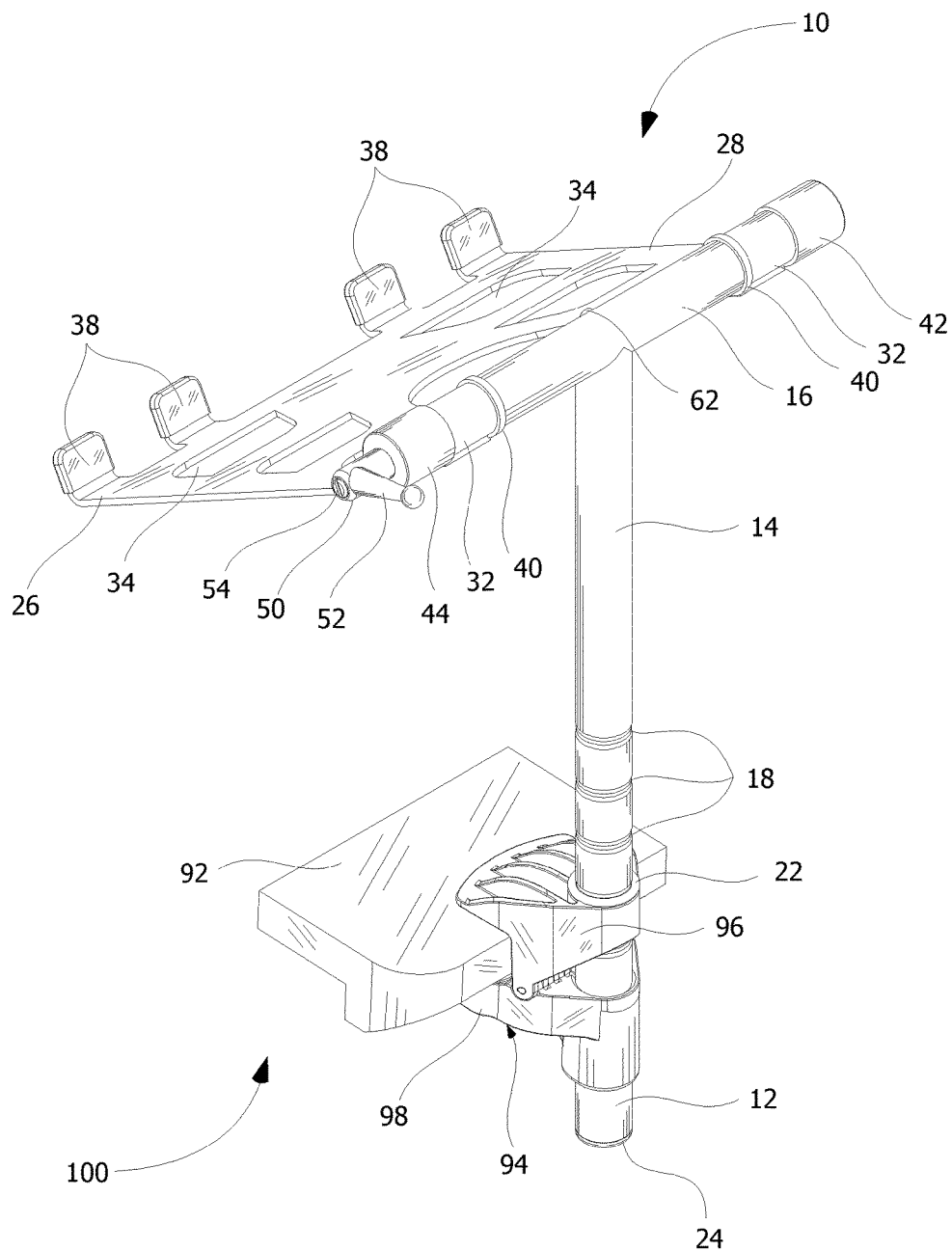
FIG. 10 is a perspective view of an equipment support system that utilizes the equipment stand assembly of FIG. 1.

Now, referring primarily to FIGS. 1, 3, 5, 6, and 7, the structural features of the illustrative embodiment of the post member 12 of the equipment stand assembly 10 will be explained. As shown in these figures, the post member 12 comprises a generally vertical portion 14 and a generally horizontal portion 16 connected to the upper end of the vertical portion 14 of the post member 12 by welding, or by another means of attachment. Thus, the illustrative post member 12 has a generally T-shaped structure, wherein the generally vertical portion 14 of the post member 12 is disposed substantially perpendicular, or perpendicular to the generally horizontal portion 16. As will be described in more detail hereinafter, the tray member 26 of the equipment stand assembly 10 is rotatably coupled to the horizontal portion 16 of the post member 12 by means of an inner tubular member 80, which is received within the central cavity 17 of the horizontal portion 16 of the post member 12 (see FIG. 6). With reference to FIGS. 1, 3, 4, and 6, it can be seen that the lower end of the vertical portion 14 of the post member 12 is provided with an end cap member 24 disposed thereon to prevent the user of the equipment stand assembly 10 from coming into contact with any sharp edges on the bottom of the post member 12, as well as to give the equipment stand assembly 10 a finished appearance. Also, as shown in FIGS. 3, 5, 6, and 10, the vertical portion 14 of the post member 12 includes a plurality of grooves 18 (e.g., five (5) grooves 18) vertically spaced-apart along a length thereof. In FIGS. 1, 3, and 5, it can be seen that an elastically deformable ring 22 (e.g., an O-ring) has been selectively positioned in the bottommost one of the grooves 18. As best shown in FIG. 10, the elastically deformable ring 22 establishes a user's preferred height setting of the post member 12. That is, in FIG. 10, the post member 12 of the equipment stand assembly 10 has been inserted into the clamp assembly 94 until the elastically deformable ring 22 reaches the top of the clamp assembly 94. Advantageously, the use of the elastically deformable ring 22 in a selected one of the grooves 18 allows the user to easily determine how far the post member 12 must be inserted into the clamp assembly 94 in order to achieve a particular desired height of the equipment stand assembly 10 (i.e., it provides a height memory setting). For example, inserting the ring 22 in the topmost groove 18 of the vertical portion 14 of the post member 12 will result in the lowest height of the tray member 26 of the equipment stand assembly 10, while inserting the ring 22 in the bottommost groove 18 of the vertical portion 14 of the post member 12 will result in the highest height of the tray member 26 of the equipment stand assembly 10. As such, the grooves 18 and ring 22 obviate the need for the user to guess as to how to achieve a particular desired height of the equipment stand assembly 10 because it clearly marks the necessary insertion distance of the post member 12 in the clamp assembly 94. Also, advantageously, the grooves 18 and ring 22 allow the user to achieve a consistent desired height of the equipment stand assembly 10 each time the stand is used (i.e., the preferred height setting is easily repeatable each time the stand 10 is set up by the user).

An equipment support system 100 that utilizes the equipment stand assembly 10 described herein is illustrated in FIG. 10. As shown in FIG. 10, the equipment support system 100 comprises a clamp assembly 94 that couples the post member 12 of the equipment stand assembly 10 to a support surface (e.g., the tabletop 92). In FIG. 10, it can be seen that the clamp assembly 94 generally includes an upper clamp member 96 this is pivotally coupled to a lower clamp member 98. The details of the clamp assembly 94 are described in Applicant's U.S. Pat. No. 9,629,491, which is incorporated by reference herein in its entirety. As shown in FIG. 10, the post member 12 of the equipment stand assembly 10 is received within the first aperture of the upper clamp member 96 of the clamp assembly 94 and the second aperture of the lower clamp member 98 of the clamp assembly 94. In FIG. 10, the elastically deformable ring 22 described in detail above is disposed proximate to a top of the upper clamp member 96 of the clamp assembly 94 so as to establish the height setting of the post member 12.

Next, referring primarily to FIGS. 1 and 6, the structural features of the illustrative embodiment of the tray member 12 of the equipment stand assembly 10 will now be described. As shown in these figures, the tray member 26 comprises a base portion 28 for receiving the item of equipment (e.g., the laptop computer 90) supported thereon and a pair of spaced-apart tubular sleeve members 32 for rotatably coupling the tray member 26 to the horizontal portion 16 of the post member 12 by means of the inner tubular member 80. As best shown in the side views of FIGS. 3 and 5, the upper edge of the base portion 28 of the tray member 26 is tangentially attached to a bottom of each of the spaced-apart tubular sleeve members 32 of the tray member 26 so that the tray member 26 advantageously lies flat against the pole member 12 when it is in its collapsed position. In an alternative embodiment, rather than being tangentially attached to each of the spaced-apart tubular sleeve members 32, the upper edge of the base portion 28 of the tray member 26 may alternatively be attached to a middle of each of the spaced-apart tubular sleeve members 32 in a generally perpendicular manner (i.e., wherein the edge of the base portion 28 generally perpendicularly bisects the side of each tubular sleeve member 32. Referring to the exploded view of FIG. 6, it can be seen that the lower edge of the base portion 28 of the tray member 26, which is disposed opposite to the upper edge of the base portion 28, is provided with a plurality of spaced-apart, upstanding tab members 30 (e.g., four (4) tab members 30) for retaining the lower edge of the item of equipment supported by the stand assembly 10 (as shown in FIGS. 3 and 5). In order to prevent the upstanding tab members 30 of the base portion 28 of the tray member 26 from inadvertently scratching or marring the item of equipment being supported (e.g., the laptop computer 90), each of the upstanding tab members 30 is provided with a substantially pliable cover member 38 disposed thereon. In an exemplary embodiment, the tab cover members 38 may be formed from a pliable polymeric material or rubber. Turning again to FIGS. 1 and 6, it can be seen that the base portion 28 of the tray member 26 comprises a plurality of different-sized apertures 34 formed therein for reducing an overall weight of the tray member 26, and for enabling the tray member 26 to be more easily rotated relative to the post member 12 of the equipment stand assembly 10.

Figure 7:
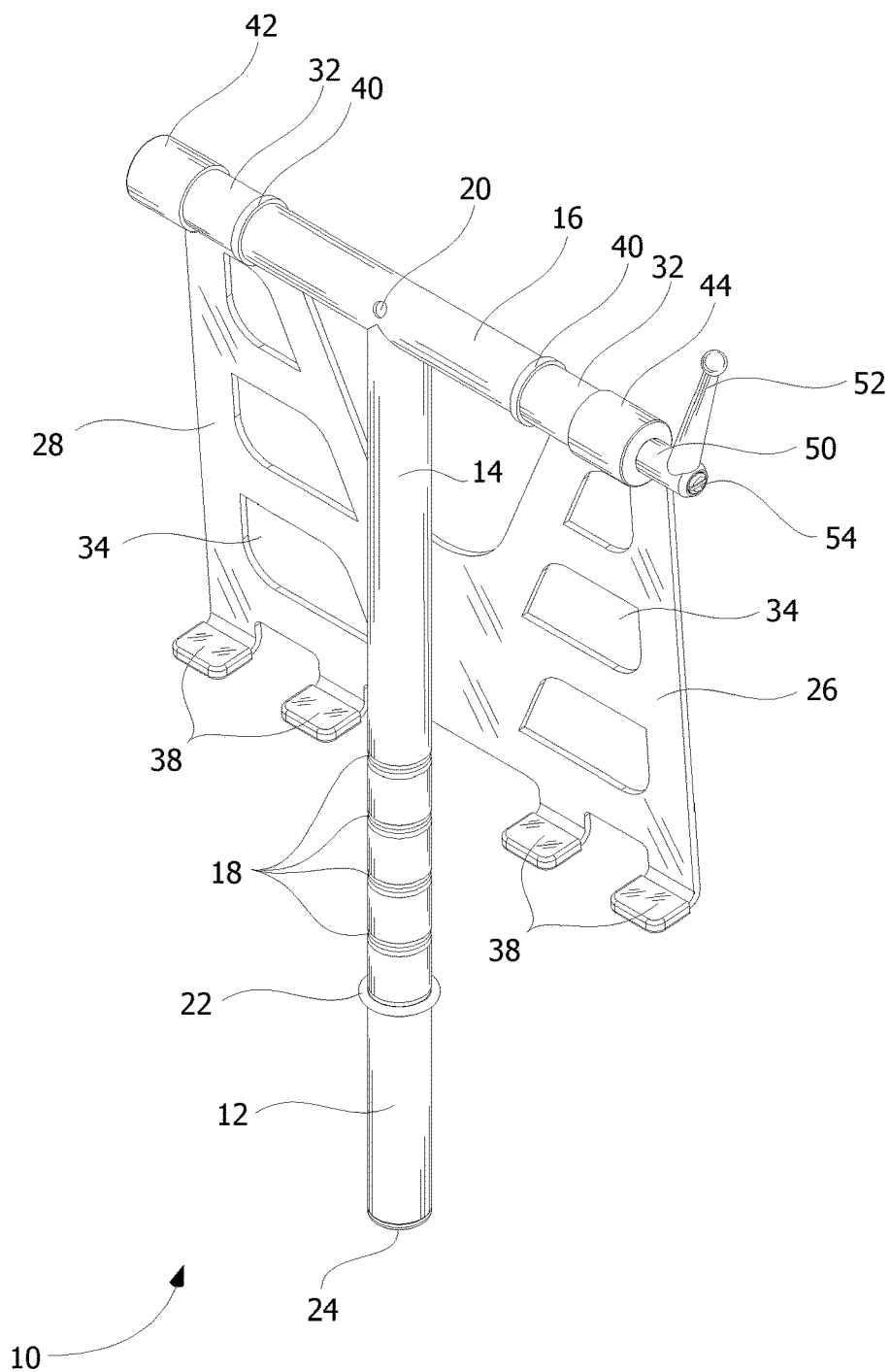
FIG. 7 is another perspective view of the equipment stand assembly of FIG. 1, wherein the tray member of the stand assembly is disposed in a collapsed position.
Figure 8:
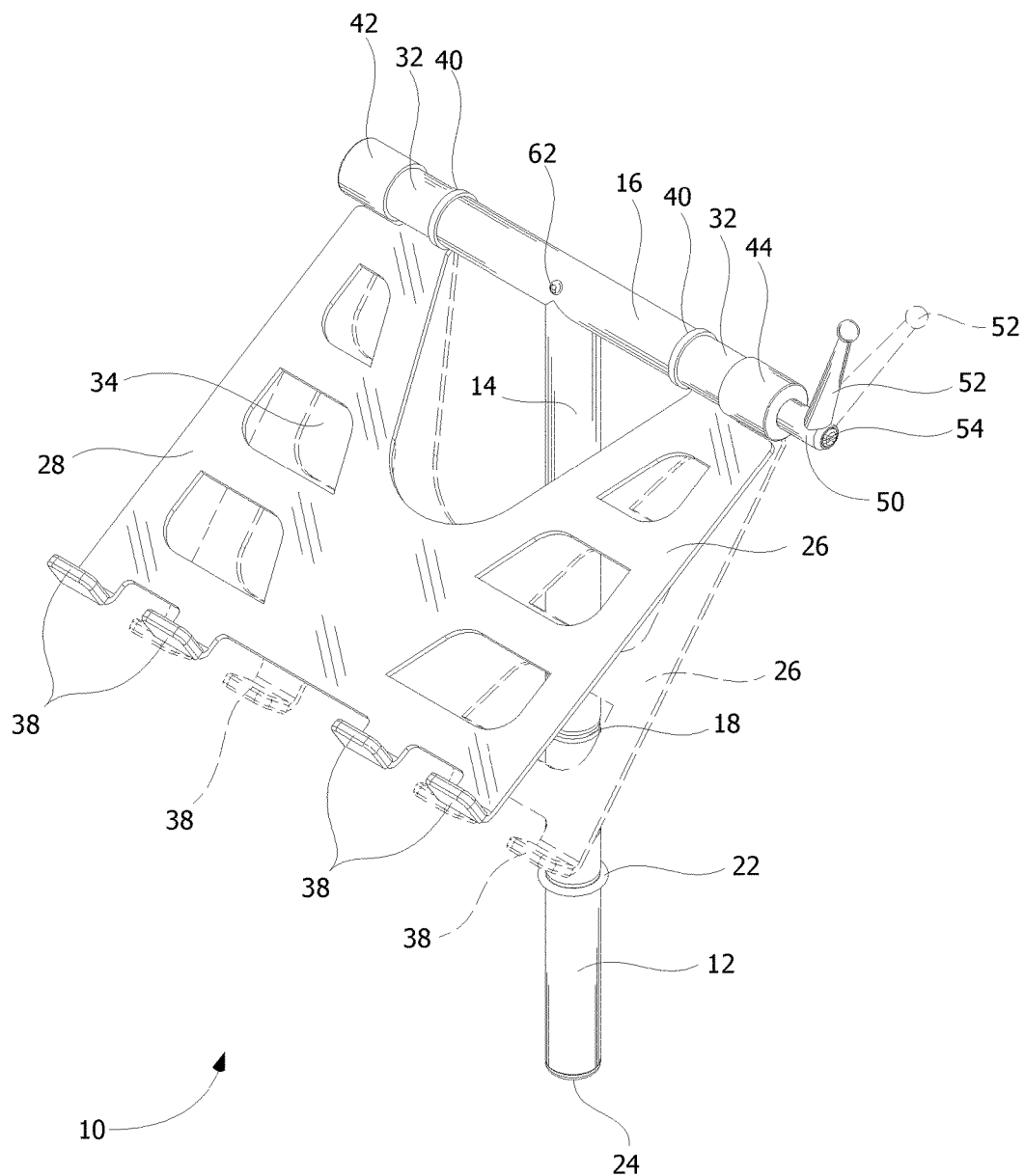
FIG. 8 is yet another perspective view of the equipment stand assembly of FIG. 1, wherein an angular adjustment of the tray member of the stand assembly is shown therein.
Figure 11:
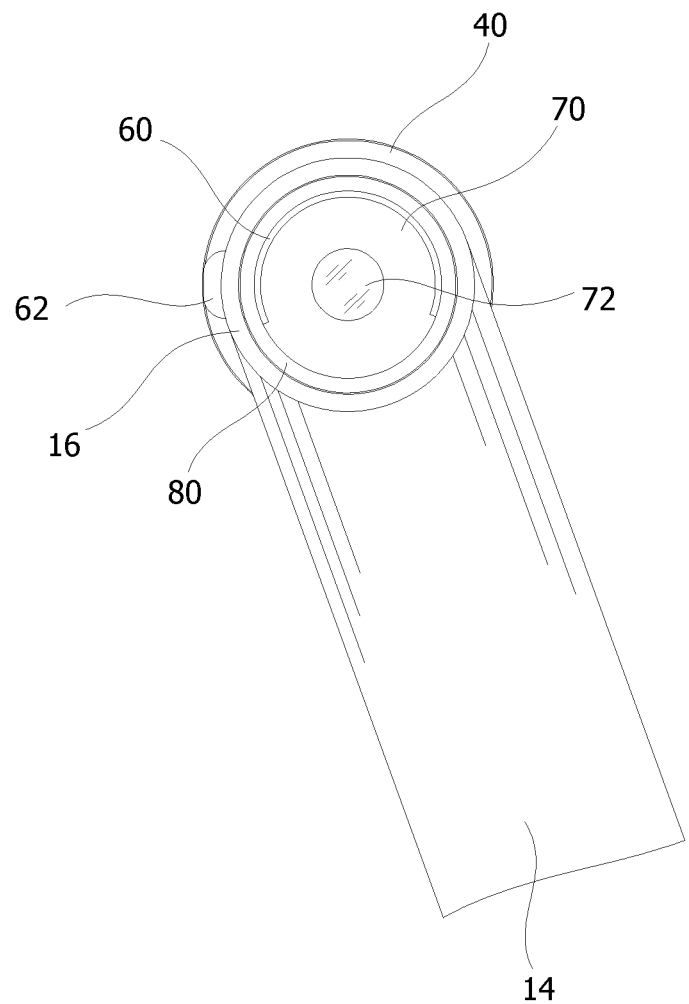
FIG. 11 is a transverse sectional view of the upper support subassembly of the equipment stand assembly of FIG. 1, wherein the section is cut along the cutting plane line B-B in FIG. 1.

Turning again to FIGS. 1, 6, and 7, the latching mechanism 60 of the equipment stand assembly 10, which maintains the tray member 26 in its active position, will now be described. As best shown in the exploded view of FIG. 6, in the illustrative embodiment, the latching mechanism 60 comprises a pushbutton or snap button device with an elongate strip portion and a detent 62 disposed on, and projecting from the elongate strip portion. In FIG. 6, it can be seen that the elongate strip portion of the snap button device 60 has a curved shape so that the elongate strip portion is capable of being received within the central cavity 88 of the inner tubular member 80 (as shown in the transverse sectional view of FIG. 11). Referring to FIGS. 6 and 11, it can be seen that the detent 62 of the snap button device 60 has a dome-shaped top. When the snap button device 60 is assembled with the inner tubular member 80, the detent 62 of the snap button device 60 extends through a snap button detent aperture 86 in the wall of the inner tubular member 80. In addition, as depicted in FIGS. 6 and 7, the horizontal portion 16 of the post member 12 comprises a snap button detent aperture 20 for receiving the detent of the snap button device 60 when the latching mechanism is engaged, thereby preventing the rotation of the tray member 26 relative to the post member 12 (e.g., as shown in FIG. 1, the rotation of the tray member 26 relative to the post member 12 is prevented by virtue of the snap button detent 62 being engaged with the aperture 20 of the post member horizontal portion 16). In alternative embodiments of the invention, it is to be understood that latching means other than the illustrated snap button device 60 may be used for maintaining the tray member 26 in its active position by preventing the rotation of the tray member 26 relative to the post member 12.

With reference to the exploded view of FIG. 6 and the longitudinal section view of FIG. 9, the illustrated embodiment of the angular setting mechanism 50, 64, 72, 74, 80 of the equipment stand assembly 10, which sets a user-desired angular position of the tray member 26 relative to the post member 12, will now be described in detail. As shown in these figures, the angular setting mechanism comprises an inner tubular member 80 having a first end and a second end disposed opposite to the first end. The first end of the inner tubular member 80 has a first pair of elongate slots 82 formed therein, while the second end of the inner tubular member 80 has a second pair of elongate slots 84 formed therein. The first and second pairs of elongate slots 82, 84 are generally mirror images of one another so that either pair of slots 82, 84 is capable of being interchangeably used to accommodate the pin member 68 protruding from the first end securement member 64 (i.e., either end of the inner tubular member 80 may be interchangeably used to accommodate the pin member 68 of the first end securement member 64). The engagement between the pin member 68 of the first end securement member 64 and one of the pairs of slots 82, 84 in the inner tubular member 80 prevents the first end securement member 64 from rotating relative to the inner tubular member 80 (i.e., the first end securement member 64 always rotates with the inner tubular member 80). In addition to accommodating the pin member 68, the slots 82, 84 also enable the end portions of the inner tubular member 80 to be more easily deformed so that the end portions are able to expand or bulge outwardly in the manner described hereinafter. As shown in FIGS. 6 and 9, the first end securement member 64 is disposed at the first end (i.e., left end) of the inner tubular member 80 and a second end securement member 74 is disposed at the second end (i.e., right end) of the inner tubular member 80. With reference to these figures, it can be seen that the first end securement member 64 has an end portion 66 having a first diameter and an elongate cylindrical body portion 70 having a second diameter. The first diameter of the end portion 66 is larger than the second diameter of the elongate cylindrical body portion 70, and the end portion 66 is connected to the elongate cylindrical body portion 70 by an inwardly tapered portion 69. Referring again to FIG. 9, it can be seen that the pin member 68 intersects, and protrudes from opposed sides of the elongate cylindrical body portion 70 of the first end securement member 64. In addition, as also shown in the longitudinal section view of FIG. 9, the elongate cylindrical body portion 70 of the first end securement member 64 is provided with an internally threaded bore 71 formed therein. As illustrated in FIGS. 6 and 9, the second end securement member 74, which is disposed at the second end (i.e., right end) of the inner tubular member 80, has a cylindrical end portion 76 and an inwardly tapered portion 78. The second end securement member 74 also includes a non-threaded aperture 79 disposed therethrough (see FIG. 6).

Now, still referring to FIGS. 6 and 9, the other constituent components of the illustrated embodiment of the angular setting mechanism of the equipment stand assembly 10 will be described. As shown in these figures, the angular setting mechanism further comprises a threaded elongate rod 72 that is provided with a plurality of external threads disposed along a length thereof. In the illustrated embodiment, the external threads at the first end (i.e., left end) of the threaded elongate rod 72 threadingly engage the internal threads of the internally threaded bore 71 in the first end securement member 64 and the external threads at the second, opposite end (i.e., right end) of the threaded elongate rod 72 threadingly engage the internal threads 58 of a shaft portion 56 of a handle member 50. In an alternative embodiment, rather than the first end of the threaded elongate rod 72 being threadingly engaged with the internally threaded bore 71 of the first end securement member 64, the first end of the threaded elongate rod 72 could be affixed to the first end securement member 64 using other means, such as welding, etc. As depicted in FIGS. 6 and 9, the handle member 50 comprises a handle portion 52 coupled to the shaft portion 56 by a fastener member 54 (e.g., a shoulder screw). In other embodiments, rather than using a shoulder screw, the fastener member 54 may comprise a headless screw and nut. Also, as will be explained hereinafter, in the illustrated embodiment, the handle member 50 may comprise a repositionable handle wherein the handle portion 52 is capable of being rotated relative to the shaft portion 56 of the handle member 50. While the handle member 50 is disposed on the right side of the tray member 26 in the illustrated embodiment, it is to be understood that, in other embodiments, the handle member 50 may be alternatively disposed on the left side of the tray member 26.

Next, with reference primarily to the longitudinal section view of FIG. 9, the functionality of the angular setting mechanism of the equipment stand assembly 10 will be explained. When a user applies a torque to the handle member 50 in a tightening direction (e.g., in a clockwise direction), the threaded elongate rod 72 is configured to axially displace the first end securement member 64 inwardly towards the longitudinal center of the inner tubular member 80 and the shaft portion 56 of the handle member 50 is configured to axially displace the second end securement member 74 inwardly towards the longitudinal center of the inner tubular member 80 so that the opposed end portions of the inner tubular member 80 bulge radially outward, thereby preventing a rotation of the tray member 26 relative to the inner tubular member 80 and establishing the user-desired angular position setting of the tray member 26. That is, when the first end securement member 64 is displaced inwardly towards the longitudinal center of the inner tubular member 80, the inwardly tapered portion 69 of the first end securement member 64 is wedged into the first end of the inner tubular member 80, and thus deforms the first end portion of the inner tubular member 80 in a radially outward direction. Similarly, when the second end securement member 74 is displaced inwardly towards the longitudinal center of the inner tubular member 80, the inwardly tapered portion 78 of the second end securement member 74 is wedged into the second end of the inner tubular member 80, and thus deforms the second end portion of the inner tubular member 80 in a radially outward direction. The non-threaded aperture 79 of the second end securement member 74 allows the second end securement member 74 to be slidably displaced inwardly along the threaded elongate rod 72 by the shaft portion 56 of the handle member 50 without engaging the external threads of the threaded elongate rod 72. When the first and second end portions of the inner tubular member 80 are pushed radially outward by the inward displacement of the first and second end securement members 64, 74, the first and second end portions of the inner tubular member 80 are pushed into contact with the interior surfaces of the spaced-apart tubular sleeve members 32 of the tray member 26 so as prevent a rotation of the angular setting mechanism relative to the tubular sleeve members 32 of the tray member 26 (i.e., the angular setting mechanism frictionally engages the interior walls of the tubular sleeve members 32 so that the angular setting mechanism becomes fixed relative to the tubular sleeve members 32 of the tray member 26). As such, when the tray member 26 is rotated by a user, the angular setting mechanism rotates together with the tray member 26, and the user-desired angular position setting of the tray member 26 remains undisturbed when the tray member 26 is rotated back-and-forth between its active and collapsed positions. When a user wants to set a new preferred angular position, he or she simply applies a torque to the handle member 50 in a direction opposite to the tightening direction (e.g., in a counterclockwise direction), which results in the first and second end securement members 64, 74 being released from engagement with the opposed ends of the inner tubular member 80 so that the inner tubular member 80 may rotate relative to the tubular sleeve members 32 of the tray member 26. Once the user finds the preferred angular position setting of the tray member 26, he or she applies the tightening torque to the handle member 50 in the manner described above to establish the new preferred angular position setting of the tray member 26. A plurality of different angular position settings of the tray member 26 are diagrammatically represented in FIG. 8.

Referring again to the illustrative embodiment of FIGS. 6 and 9, the features of the repositionable handle member 50 will be described. As mentioned above, in the illustrative embodiment, the handle member 50 is in the form of a repositionable handle, wherein the handle portion 52 is capable of being rotated relative to the shaft portion 56 of the handle member 50. Advantageously, the handle portion 52 of the handle member 50 is capable of being selectively repositioned by the user without interfering with the user-desired angular position setting of the tray member 26 so as to prevent the handle portion 52 of the handle member 50 from obstructing the item of equipment (e.g., the laptop computer 90) supported by the tray member 26. With combined reference to FIGS. 6 and 9, in addition to the handle portion 52, the fastener member 54, and the shaft portion 56 described above, the repositionable handle subassembly includes a spring member 53 for biasing the handle portion 52 in an engaged position with the shaft portion 56 of the repositionable handle subassembly. As shown in FIG. 6, the shaft portion 56 of the repositionable handle subassembly comprises a plurality of circumferentially spaced-apart external teeth 57 thereon. The handle portion 52 of the handle member or subassembly 50 comprises a corresponding plurality of circumferentially spaced-apart internal teeth thereon that are configured to matingly engage with the plurality of circumferentially spaced-apart external teeth 57 on the shaft portion 56 (i.e., teeth engagement denoted by reference numeral 48 in FIG. 9). When a user displaces the handle portion 52 of the handle subassembly 50 in an axially outward direction, the plurality of circumferentially spaced-apart internal teeth on the handle portion 52 are disengaged from the plurality of circumferentially spaced-apart external teeth 57 on the shaft portion 56 so as to allow the handle portion 52 to freely rotate relative to the shaft portion 56 for the repositioning thereof. When the user displaces the handle portion 52 of the handle subassembly 50 in the axially outward direction, the spring member 53 is compressed between the protruding annular edge formed by the head of the fastener member 54 and the annular ledge formed by the handle portion 52 so that the handle portion 52 is biased back to its non-outwardly displaced position. When the handle portion 52 of the handle subassembly 50 is not displaced by the user in an axially outward direction, or the axially outward force applied to the handle portion 52 is released by the user, the plurality of circumferentially spaced-apart internal teeth on the handle portion 52 are engaged with the plurality of circumferentially spaced-apart external teeth 57 on the shaft portion 56 so as to allow the user to apply the tightening torque to the handle member 50 for preventing the rotation of the tray member 26 relative to the inner tubular member 80 and establishing the user-desired angular position setting of the tray member 26.

Now, with combined reference to the assembled perspective view of FIG. 1 and the exploded perspective of FIG. 6, additional constituent components of the illustrative upper support subassembly of the equipment stand assembly 10 will be explained. The inner tubular member 80 of the angular setting mechanism of the equipment stand assembly 10 couples the tray member 26 to the horizontal portion 16 of the post member 12 by being inserted through the central cavities 36 of each of the spaced-apart tubular sleeve members 32 of the tray member 26 and through the central cavity 17 of the horizontal portion 16 of the post member 12 (i.e., inner tubular member 80 essentially acts as a pin connecting these two components 12, 26 to one another). As shown in FIGS. 1 and 6, each of the tubular sleeve members 32 of the tray member 26 is spaced apart from a respective end of the horizontal portion 16 of the post member 12 by a respective ring spacer member 40 (i.e., the gap between each tubular sleeve member 32 of the tray member 26 and the respective end of the horizontal portion 16 of the post member 12 is filled by one of the ring spacer members 40). As shown in the assembled perspective view of FIG. 1, the outer end portion of the first tubular sleeve member 32 of the tray member 26 is covered by a first end cover member 42. Similarly, the outer end portion of the second tubular sleeve member 32 of the tray member 26 is covered by a second end cover member 44. The second end cover member 44 is generally the same as the first end cover member 42, except that the second end cover member 44 comprises a central aperture 46 disposed in the end thereof for accommodating the cylindrical sleeve of the handle portion 52 of the handle member 50 passing therethrough.

In an exemplary embodiment, the post member 12, the tray member 26, the angular setting mechanism 50, 64, 72, 74, 80, and the latching mechanism 60 of the equipment stand assembly 10 may be formed from a suitable metallic material or metal. Also, in an exemplary embodiment, the ring spacer members 40 and that first and second end cover members 42, 44 of the equipment stand assembly 10 may be formed from a suitable pliable polymeric material or rubber.

It is readily apparent that the aforedescribed equipment stand assembly 10 offers numerous advantages. First, the equipment stand assembly 10 advantageously remembers a preferred angular position setting of a user even when the stand 10 is collapsed, thereby obviating the need for a user to reconfigure the preferred angular position of the stand 10 each time the stand is used. Secondly, the equipment stand assembly 10 does not require a significant amount of force to lock the stand 10 into its desired angular position. Finally, the equipment stand assembly 10 does not require a series of elaborate steps to be carried out by the user each time that the stand 10 is used (e.g., if the same angular position is used each time, all the user has to do is latch and unlatch the tray member 26 of the stand 10 by using the snap button member 60).

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention. For example, while the equipment support system 100 described herein secures the post member 12 of the equipment stand assembly 10 to the tabletop 92 using a clamp assembly 94 (see FIG. 10), it is to be understood that, in other embodiments of the invention, the bottom end of the post member 12 may be provided with a base mounted thereto for allowing the equipment stand assembly 10 to set directly on the tabletop surface (i.e., a tabletop version of the equipment stand assembly 10 may be provided in these other embodiments of the invention).

Also, it is to be understood the equipment stand assembly 10 described herein may be used for supporting virtually any object or device above a surface or surfaces (e.g., a tabletop surface). For example, in addition to the laptop computer 90 illustrated in FIGS. 3 and 5, the equipment stand assembly 10 may also be used for supporting a tablet computing device, a book, sheets of music, etc.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A stand assembly for supporting an object in a cantilevered manner above a surface, said stand assembly comprising:
   a post member;
   a tray member coupled to said post member, said tray member including at least one tubular sleeve, said tray member configured to support said object in said cantilevered manner above said surface, said tray member configured to be rotatable between an active position for supporting said object and a collapsed position;
   an angular setting mechanism including an inner tubular member, a section of said inner tubular member being disposed within said at least one tubular sleeve of said tray member, said angular setting mechanism configured to set a user-desired angular position of said tray member relative to said post member so as to establish a user-desired angular position setting, said angular setting mechanism configured to set said user-desired angular position of said tray member by deforming a portion of said inner tubular member radially outward into frictional engagement with a portion of said at least one tubular sleeve of said tray member, thereby preventing a rotation of said inner tubular member relative to said at least one tubular sleeve; and
   a latching mechanism, said latching mechanism configured to maintain said tray member in said active position when said latching mechanism is engaged with said tray member by preventing a rotation of said tray member relative to said post member;
   wherein said user-desired angular position setting is maintained when said tray member is rotated from said active position to said collapsed position so that said tray member generally returns to said user-desired angular position when said tray member is rotated from said collapsed position to said active position.

2. The stand assembly according to claim 1, wherein said post member comprises a vertical portion and a horizontal portion, said tray member being rotatably coupled to said horizontal portion of said post member by means of said inner tubular member.

3. The stand assembly according to claim 2, wherein said tray member comprises a base portion for receiving said object supported thereon, said at least one tubular sleeve of said tray member being rotatably coupled to said horizontal portion of said post member by means of said inner tubular member.

4. The stand assembly according to claim 3, wherein said base portion of said tray member is tangentially attached to said at least one tubular sleeve of said tray member.

5. The stand assembly according to claim 2, wherein said latching mechanism comprises a snap button device, said snap button device comprising an elongate strip portion with a detent disposed thereon, said elongate strip portion of said snap button device having a curved shape so that said elongate strip portion is capable of being received within an interior of said inner tubular member, said detent of said snap button device extending through a first aperture in a wall of said inner tubular member.

6. The stand assembly according to claim 5, wherein said horizontal portion of said post member comprises a second aperture for receiving said detent of said snap button device when said latching mechanism is engaged so as to prevent said rotation of said tray member relative to said post member.

7. The stand assembly according to claim 1, wherein said inner tubular member of said angular setting mechanism has a first end and a second end disposed opposite to said first end, and said angular setting mechanism further comprises at least one end securement member disposed at one of said first and second ends of said inner tubular member, an elongate rod coupled to said at least one end securement member, and a handle member coupled to said elongate rod;
   wherein, when a user applies a tightening torque to said handle member, said elongate rod is configured to axially displace said at least one end securement member inwardly towards a center of said inner tubular member so that said portion of said inner tubular member bulges radially outward, thereby preventing a rotation of said tray member relative to said inner tubular member and establishing said user-desired angular position setting of said tray member.

8. The stand assembly according to claim 7, wherein said at least one end securement member comprises a first end securement member disposed at said first end of said inner tubular member and a second end securement member disposed at said second end of said inner tubular member, said first end securement member being attached to a first end of said elongate rod, and said handle member being attached to a second end of said elongate rod that is opposite to said first end of said elongate rod;
   wherein, when a user applies said tightening torque to said handle member, said elongate rod is configured to axially displace said first end securement member inwardly towards said center of said inner tubular member and said handle member is configured to axially displace said second end securement member inwardly towards said center of said inner tubular member so that opposed end portions of said inner tubular member bulge radially outward, thereby preventing a rotation of said tray member relative to said inner tubular member and establishing said user-desired angular position setting of said tray member.

9. The stand assembly according to claim 8, wherein said elongate rod is provided with a plurality of external threads disposed along a length thereof, said first end securement member is provided with an internally threaded bore for threadingly engaging said external threads at said first end of said elongate rod, and a shaft portion of said handle member is provided with a plurality of internal threads disposed therein for threadingly engaging said external threads at said second end of said elongate rod.

10. The stand assembly according to claim 9, wherein said second end securement member comprises a non-threaded aperture disposed therethrough for receiving said elongate rod, said non-threaded aperture of said second end securement member allowing said second end securement member to be slidably displaced relative to said threaded elongate rod.

11. The stand assembly according to claim 7, wherein said handle member is in the form of a repositionable handle with a handle portion that is capable of being rotated relative to a shaft portion of said handle member so that said handle portion of said handle member is capable of being selectively repositioned by said user without interfering with said user-desired angular position setting of said tray member, and preventing said handle portion of said handle member from obstructing said object supported by said tray member.

12. The stand assembly according to claim 11, wherein said shaft portion of said handle member comprises a plurality of circumferentially spaced-apart external teeth thereon, and said handle portion of said handle member comprises a plurality of circumferentially spaced-apart internal teeth thereon that are configured to matingly engage with said plurality of circumferentially spaced-apart external teeth on said shaft portion;
   wherein, when a user displaces said handle portion of said handle member in an axially outward direction, said plurality of circumferentially spaced-apart internal teeth on said handle portion are disengaged from said plurality of circumferentially spaced-apart external teeth on said shaft portion so as to allow said handle portion to freely rotate for repositioning; and
   wherein, when said handle portion of said handle member is not displaced by said user in an axially outward direction, said plurality of circumferentially spaced-apart internal teeth on said handle portion are engaged with said plurality of circumferentially spaced-apart external teeth on said shaft portion so as to allow said user to apply said tightening torque to said handle member for preventing said rotation of said tray member relative to said inner tubular member and establishing said user-desired angular position setting of said tray member.

13. The stand assembly according to claim 1, wherein said post member comprises a vertical portion and a horizontal portion, said vertical portion of said post member including a plurality of grooves spaced-apart along a length thereof, and wherein said stand assembly further comprises an elastically deformable ring configured to be positioned in a selected one of said plurality of grooves by a user so as to establish a height setting of said post member.

14. The stand assembly according to claim 13, further comprising a clamp assembly configured to couple said post member to said surface, said post member configured to be received within one or more apertures of said clamp assembly, said elastically deformable ring configured to be disposed proximate to a top of said clamp assembly so as to establish said height setting of said post member.

15. A stand assembly for supporting an object in a cantilevered manner above a surface, said stand assembly comprising:
   a post member having a vertical portion, said vertical portion of said post member including a plurality of grooves spaced apart along a length thereof;
   a support member coupled to said post member, said support member configured to support said object in said cantilevered manner above said surface; and
   an elastically deformable ring configured to be positioned in a selected one of said plurality of grooves in said vertical portion of said post member by a user so as to establish a height setting of said post member.

16. The stand assembly according to claim 15, further comprising a clamp assembly configured to couple said post member to said surface, said post member configured to be received within one or more apertures of said clamp assembly, said elastically deformable ring configured to be disposed proximate to a top of said clamp assembly so as to establish said height setting of said post member.

17. A stand assembly for supporting an object, said stand assembly comprising:
   an outer tubular member;
   an inner tubular member, at least a section of said inner tubular member being disposed within said outer tubular member;
   a position setting mechanism configured to set an angular position of one of said inner tubular member and said outer tubular member relative to the other of said inner tubular member and said outer tubular member by deforming a portion of said inner tubular member radially outward into frictional engagement with a portion of said outer tubular member, thereby preventing a rotation of said one of said inner tubular member and said outer tubular member relative to said other of said inner tubular member and said outer tubular member.

18. The stand assembly according to claim 17, wherein said inner tubular member has a first end and a second end disposed opposite to said first end, and wherein said position setting mechanism comprises a first displaceable member disposed at said first end of said inner tubular member, an elongate rod coupled to said first displaceable member, and an adjustment member coupled to said elongate rod;
   wherein, when a user applies a tightening torque to said adjustment member, said elongate rod is configured to axially displace said first displaceable member inwardly towards a center of said inner tubular member such that said inner tubular member is deformed radially outward.

19. The stand assembly according to claim 18, wherein said adjustment member of said position setting mechanism is in the form of a handle member.

20. The stand assembly according to claim 19, wherein said position setting mechanism further comprises a second displaceable member disposed at said second end of said inner tubular member, said first displaceable member being attached to a first end of said elongate rod, and said handle member being attached to a second end of said elongate rod that is opposite to said first end of said elongate rod;
   wherein, when a user applies said tightening torque to said handle member, said elongate rod is configured to axially displace said first displaceable member inwardly towards said center of said inner tubular member and said handle member is configured to axially displace said second displaceable member inwardly towards said center of said inner tubular member so that opposed end portions of said inner tubular member are deformed radially outward so as to prevent a rotation of said one of said inner tubular member and said outer tubular member relative to said other of said inner tubular member and said outer tubular member.

* * * * *